US008156092B2

(12) United States Patent (10) Patent No.: US 8,156,092 B2
Hewett et al. (45) Date of Patent: Apr. 10, 2012

(54) DOCUMENT DE-DUPLICATION AND MODIFICATION DETECTION

(76) Inventors: Jeffrey R. Hewett, Pearland, TX (US);
Michael S. Hewett, Palo Alto, CA (US);
Daria K. Hewett, Palo Alto, CA (US)

( * ) Notice: Subject to any disclaimer, the term of this patent is extended or adjusted under 35 U.S.C. 154(b) by 149 days.

(21) Appl. No.: 12/022,144

(22) Filed: Feb. 27, 2008

(65) Prior Publication Data

US 2009/0192978 A1 Jul. 30, 2009

Related U.S. Application Data

(63) Continuation of application No. 12/022,137, filed on Jan. 29, 2008.

(51) Int. Cl.
*G06F 17/00* (2006.01)
*G06F 17/30* (2006.01)
(52) U.S. Cl. .................. 707/698; 707/758; 707/825
(58) Field of Classification Search .................. 707/609,
707/625, 638, 687, 694–701, 705, 791, 797,
707/801, 802, 806, 821–825, 828–831, 758
See application file for complete search history.

(56) References Cited

U.S. PATENT DOCUMENTS

| 6,098,079 | A  | * | 8/2000  | Howard          | 1/1     |
|-----------|----|---|---------|-----------------|---------|
| 6,128,623 | A  | * | 10/2000 | Mattis et al.   | 711/118 |
| 6,161,113 | A  | * | 12/2000 | Mora et al.     | 715/234 |
| 6,199,107 | B1 | * | 3/2001  | Dujari          | 709/219 |
| 6,205,549 | B1 | * | 3/2001  | Pravetz         | 713/182 |
| 6,523,115 | B1 | * | 2/2003  | Ono et al.      | 713/181 |
| 6,547,829 | B1 | * | 4/2003  | Meyerzon et al. | 715/234 |
| 6,820,081 | B1 | * | 11/2004 | Kawai et al.    | 1/1     |
| 6,847,961 | B2 | * | 1/2005  | Silverbrook et al. | 235/435 |
| 7,401,080 | B2 | * | 7/2008  | Benton et al.   | 1/1     |
| 2004/0010543 | A1 | * | 1/2004 | Grobman        | 709/203 |

(Continued)

FOREIGN PATENT DOCUMENTS

WO WO 98/47259 * 10/1998

(Continued)

OTHER PUBLICATIONS

"Message Digests, Message authrentication codes, and digital signatures", Practical Guide for Programmers 2004, pp. 101-118.*

(Continued)

*Primary Examiner* — Srirama Channavajjala
(74) *Attorney, Agent, or Firm* — Gregory K. Goshorn; Greg Goshorn, P.C.

(57) ABSTRACT

Provided is a system and method for the de-duplication and modification detection of documents collected during document production. The disclosed technology provides a simple, legally defensible, rapid and cost-efficient system for collecting responsive electronic document sets, identifying and eliminating unnecessary documents by comparing a collected document to previously collected documents and copying only information that has not been duplicated. The disclosed technology provides a method for copying the unduplicated information without transmitting or storing the duplicated portions. In addition, the claimed subject matter provides a system for detecting whether or not a document being submitted to a project archive is a modification of a previously submitted document. A document being submitted that represents a modification of a previously submitted document is prevented from being added to the project document archive.

15 Claims, 8 Drawing Sheets

U.S. PATENT DOCUMENTS

| | | | |
|---|---|---|---|
| 2004/0064693 A1* | 4/2004 | Pabla et al. | 713/168 |
| 2007/0050423 A1* | 3/2007 | Whalen et al. | 707/200 |
| 2007/0061373 A1* | 3/2007 | Kilday | 707/200 |
| 2007/0100795 A1* | 5/2007 | Davies | 707/3 |
| 2007/0220614 A1* | 9/2007 | Ellis et al. | 726/27 |
| 2008/0040388 A1* | 2/2008 | Petri et al. | 707/104.1 |
| 2009/0164427 A1* | 6/2009 | Shields et al. | 707/3 |
| 2009/0171888 A1* | 7/2009 | Anglin | 707/2 |

FOREIGN PATENT DOCUMENTS

WO    WO 2007/117643    * 10/2007

OTHER PUBLICATIONS

Min Cai et al. "A subscribable peer-to-peer RDF repository for distributed metadata management", Journal of Web Semantics, 2(2004) pp. 109-130.*

* cited by examiner

DOCUMENT DE-DUPLICATION AND MODIFICATION DETECTION

CROSS-REFERENCES TO RELATED APPLICATIONS

The present application is a Continuation, and claims benefit of the filing date, of an application entitled "System for Automatic Discovery Management and Data Collection." Ser. No. 12/022,137, filed Jan. 29, 2008.

BACKGROUND

1. Technical Field

The claimed subject matter relates generally to a method and system for document management and, more specifically, to de-duplication and modification detection of files collected during document production in a legal setting.

2. Description of the Related Art

The use of computers in business and personal life has enabled people to be more productive. Of course, this increased in productivity also implies that more documents are generated and stored. A large percent of generated documents exist either in part or solely in the form of electronic data storage and, as storage capacity has continued to increase and become cheaper, fewer documents are ever discarded or deleted.

In the United States, parties to legal proceedings are often given wide latitude to request and examine documents in the possession of other parties. Judicial rules relating to this process, or document discovery and production, often specify that electronically stored documents be provided in the original format and include any associated metadata. Typically, document discovery and production is both labor intensive and time-consuming, particularly in light of the large volume of electronically stored materials. A party that is required to meet such a request must locate all possible documents, filter out documents that are not responsive to a specific request or are privileged and provide access to the filtered materials.

Current methods for the production of electronically stored documents have been developed "ad hoc" and, therefore suffer from serious shortcomings. For example, computer hard drives are often mirrored, or "disk copied," onto alternative hard drives, documents on the alternative hard drive are converted to physical formats such as printed paper and, then, personnel review each of the papers to ensure that relevant documents are produced, non-responsive documents are excluded and privileged documents are protected. One drawback of this approach is that many documents that are not relevant are printed, duplicated and reviewed, thus increasing the time and expense of document production and well as the change of errors.

SUMMARY OF THE CLAIMED SUBJECT MATTER

Provided is a system and method for the de-duplication and modification detection of documents collected during document production. In judicial litigation, document production is a time-consuming and expensive necessity. Because the United States judicial system operates on the principle that justice is best served when parties have access to as many of the relevant facts as possible, each party is typically required by law to make relevant materials available to other parties. Procedural rules, both state and Federal, mandate the manner in which this process, or "document production," is conducted. It should be noted that the term "document production" does not imply the creation of documents but rather such activities as, but not limited to, the collection, filtering and transmitting of documents to different parties within a legal, or judicial, setting. Rules relating to document production specify such requirements as, but not limited to, the types of material subject to disclosure, where or not any particular material is protected by privilege and custodial and notice requirements.

The disclosed technology provides a simple, legally defensible, rapid and cost-efficient system for collecting responsive electronic document sets, identifying and eliminating unnecessary documents by comparing a collected document to previously collected documents and copying only information that has not been duplicated. Although a particular document may be stored in multiple locations across one or more computer networks, information such as metadata associated with each copy may differ. The disclosed technology provides a method for copying the unduplicated information without transmitting or storing the duplicated portions. For example, multiple parties may have a copy of a particular piece of correspondence but information such as, but not limited to, the identity of the person holding the correspondence, the time the correspondence was first received and the time the correspondence was last-accessed would typically differ from copy to copy. In other words, the disclosed technology provides a system and method for storing necessary information while reducing document transmission time, storage space and review time while preserving chain of custody information.

In addition, the claimed subject matter provides a system for detecting whether or not a document being submitted to a project archive is a modification of a previously submitted document. A document being submitted that represents a modification of a previously submitted document is prevented from being added to the project document archive.

This summary is not intended as a comprehensive description of the claimed subject matter but, rather, is intended to provide a brief overview of some of the functionality associated therewith. Other systems methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures, in which:

DETAILED DESCRIPTION OF THE FIGURES

Although described with particular reference to document production in a judicial setting, the claimed subject matter can be implemented in any information technology (IT) system in which the elimination of unnecessary document handling is desired. Those with skill in the computing arts will recognize that the disclosed embodiments have relevance to a wide variety of computing environments in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any physical means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for document collection and production. The term "programmed method", as used herein, is defined to mean one or more process steps that are presently performed; or, alternatively, one or more process steps that are enabled to be performed at a future point in time. The term programmed method anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative firm wherein, at any given point in time, only one of the plurality of alternative forms is present.

Figure 1:
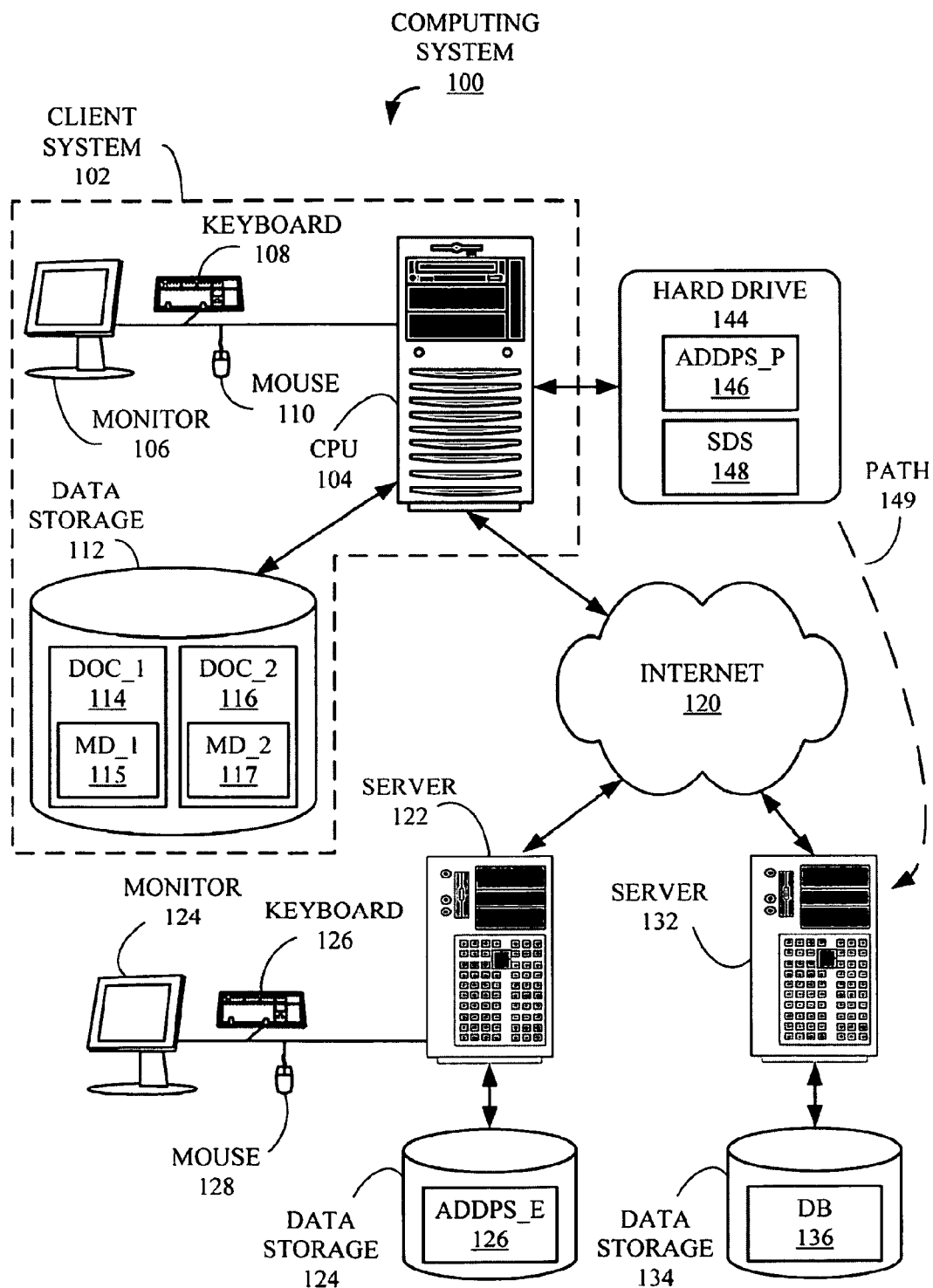
FIG. 1 is a block diagram of a computing system architecture employed as one example of an environment in which the claimed subject matter may be deployed.

Turning now to the figures, FIG. 1 is a block diagram of a computing system architecture 100 employed as one example of an environment in which the claimed subject matter may be deployed. A client system 102 includes a central processing unit (CPU) 104, coupled to a monitor 106, a keyboard 108 and a mouse 110, which together facilitate human interaction with computing system 100 and client system 102. Also included in client system 102 and attached to CPU 104 is a data storage component 112, which may either be incorporated into CPU 104 i.e. an internal device, or attached externally to CPU 104 by means of various, commonly available connection devices such as but not limited to, a universal serial bus (USB) port (not shown).

Data storage 112 is illustrated storing two documents, a doc_1 114 and a doc_2 116. Documents 114 and 116 are used as examples of material that may or may not be subject to a particular document production request. Documents 114 and 116 include metadata, i.e. a MD_1 115 and a MD_2 117, respectively. Metadata is explained in more detail below in conjunction with FIG. 3. It should be noted that a typical computing system such as system 102 would store more than two documents, and perhaps thousands of documents, but for the sake of simplicity only two are shown.

Client system 102 and CPU 104 are connected to the Internet 120, which is also connected to a server computer 122 and a server computer 132. Like client system 102, server 122 is coupled to a monitor 124, a keyboard 126 and a mouse 128, which together facilitate human interaction with server 122. Also coupled to server 122 is a data storage 124, which is illustrated as storing one example of an automatic document discovery and production system (ADDPS), i.e. an ADDPS_E 126. ADDPS_E 126 is an "Enterprise" embodiment of the claimed subject matter, which is described in more detail below in conjunction with FIGS. 2-8. ADDPS_E 126 is configured to enable document collection from any network accessible location such as client system 102, server 122 or server 132. Although not shown, server 132 would also typically have a monitor, keyboard and mouse like devices 106, 108 and 110. Server 132 is coupled to data storage 134 that includes a database (DB) 136 to store and manipulate collected materials. Of course DB 136 could also be located on any data storage device accessible to ADDPS_E 126, such as but not limited to data storage 124. Although in this example, client system 102, server 122 and server 132 are communicatively coupled via the Internet 120, they could also be coupled through any number of communication mediums such as, but not limited to, a local area network (LAN) (not shown). Further, it should be noted there are many possible computing system configurations, of which computing system 100 is only one simple example.

FIG. 1 also illustrates a hard drive 144 that includes a portable component of the claimed subject matter. i.e. an ADDPS_P 146. In this example, hard drive 144 is a portable USB drive that is illustrated connected to client system 102 via a USB plug (not shown). Of course, hard drive 144 may be configured to attach to a computing system via any available communication port or even be configured to be plugged into a network hub so that the claimed subject matter may be implemented simultaneously on several computing systems.

Hard drive 144 also includes a standardized directory structure (SDS) 148 to place collected files, metadata and collection event information. Collection event information includes information such as, but not limited to, the history of collection processes, who collected files, for whom files were collected and process start and ending times. Information stored in SDS 148 is stored in eXtensible Markup Language (XML) files, which when returned to ADDPS_E 126 are read by an aggregation block 222 of a Material Collection process 200, both described below in conjunction with FIG. 3.

To enable a user with access to documents subject to production, or a "custodian," to collect files such as doc_1 114 and doc_2 116, data storage 112 is configured as a mapped drive for ADDPS_P 146. In this example, ADDPS_P 146 is an applet configured to execute on CPU 104 and have access to Internet 120 via client system 102. However, access to Internet 120 is not required and an alternative path 149 for transporting collected materials is illustrated. Path 149 represents methods of transferring data stored on hard drive 144 to a server such as server 132 and may be, but is not limited to, merely unplugging hard drive 144 from client system 102 and plugging it into servers 122 or 132.

ADDPS_E 126 and ADDPS_P 146 work together to enable remote data set aggregation. ADDPS_E 126 enables a single server such as server 122 to support both local and remote data collection activities, eliminating the need for server implementations at multiple sites, some of which may have either one or few individual computers. A remote data capture by ADDPS_P 146 on hard drive 144 and subsequent aggregation integrates remote file collections into a central repository by means of a collection queuing and monitoring process. A resulting file collection, which includes file metadata and other information, is indistinguishable from a data collection created by ADDPS_E 126 alone, resulting in a single, integrated project repository. Processes associated with the collection, aggregation and processing of files associated with a project are described in more detail below in conjunction with FIGS. 2-8.

Figure 2:
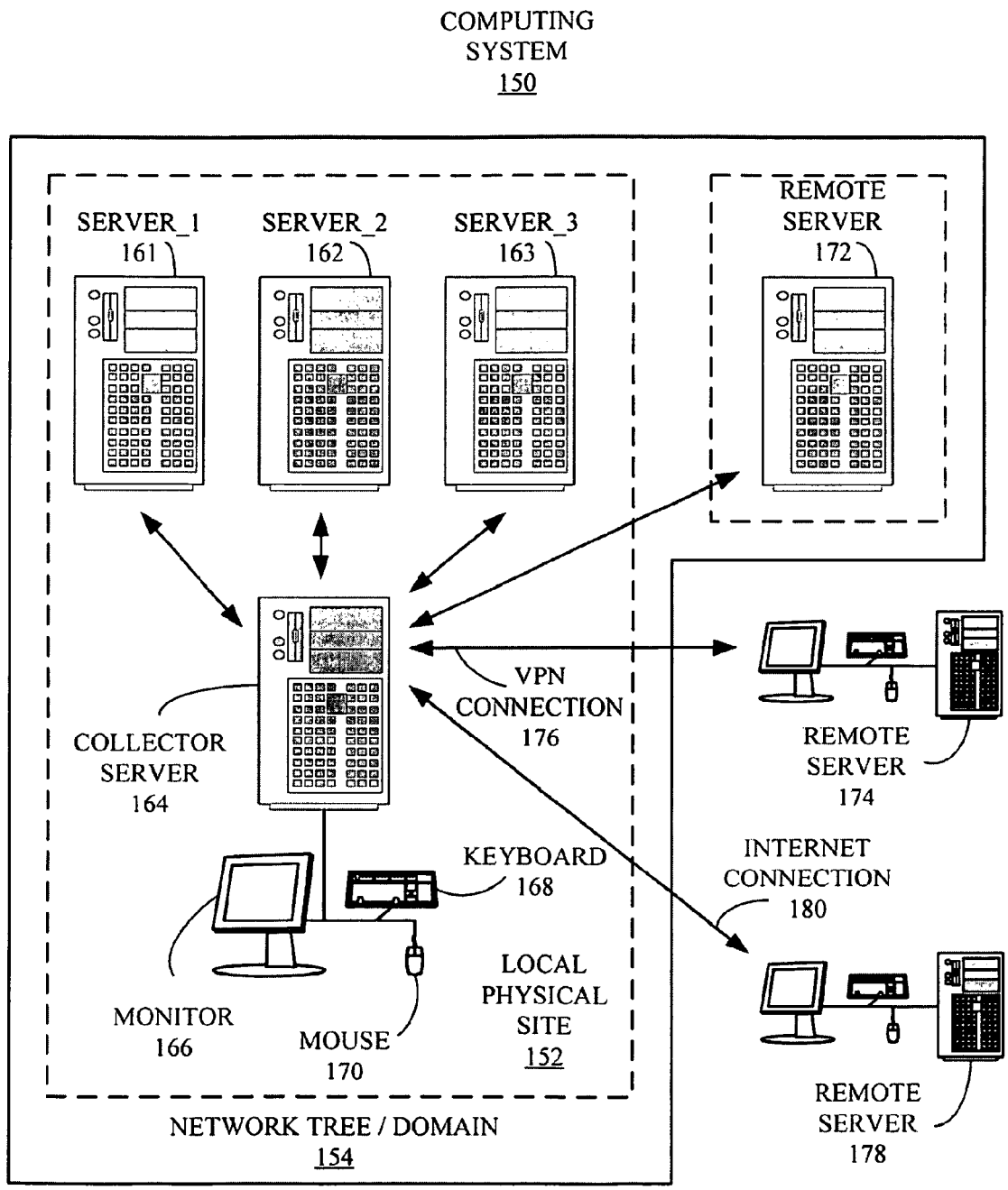
FIG. 2 is a block diagram of a second possible computing system architecture in which the claimed subject matter may be deployed.

FIG. 2 is a block diagram of a second possible computing system architecture 150 in which the claimed subject matter may be deployed. Computing system 150 shows a local physical site 152 that includes a server_1 161, a server_2 162, a server_3 163 and a collection server 164. Servers 161-164 would typically be connected via a local area network (LAN) (not shown). Collector server 164 is illustrated with a monitor 166, a keyboard 168 and a mouse 170 to enable human interaction with collection server 164 as well as servers 161-163. Although not shown, server 164 includes a ADDPS_E such as ADDPS_E 126 (FIG. 1). A remote server 172 is coupled to servers 161-164 and local physical site 152 in network tree, or "domain," 154. One possible implementation of domain 154 is as a wide area network (WAN).

Also illustrated are a remote server 174, which is coupled to local physical site 152 and domain 154 via a virtual private network (VPN) connection 176, and a remote server 178, which is coupled to local physical site 152 and domain 154 via an Internet connection 180. The disclosed techniques may be employed over VPN connection 176 such that custodians experience the same functionality as users on servers 161-164 and 172. Over Internet connection 180, the disclosed techniques support data collection from a client application such as ADDPS_P 146 (FIG. 1). Those with skill in the computing and communication arts should appreciate that computing system 150 is just one example of a computing architecture and that there are many configurations and communication techniques that could be employed to implement the claimed subject matter.

One implementation of the claimed subject matter provided server-to-server (S2S) transmission of collected files. For example, a user on collector server 164 may execute an instantiation of ADDPS_E 126 to retrieve materials from remote server 172. If a destination database is on server_3 163, a list of files to be collected may be transmitted to server_3 163 rather than the actual files. Then, server_3 163, rather than server 164, schedules and executes the transmission of the actual files from server 172 to server 163. There are at least three advantages to this approach: 1) files may be transmitted faster between remote server 172 and server 164 by removing server 164 from the transmission process; 2) an administrator is able to more efficiently manage server utilization; and 3) an administrator is able to more efficiently manage communication bandwidth resources. Collection queuing and monitoring functions are described in more detail below in conjunction with FIGS. 3 and 8.

Figure 3:
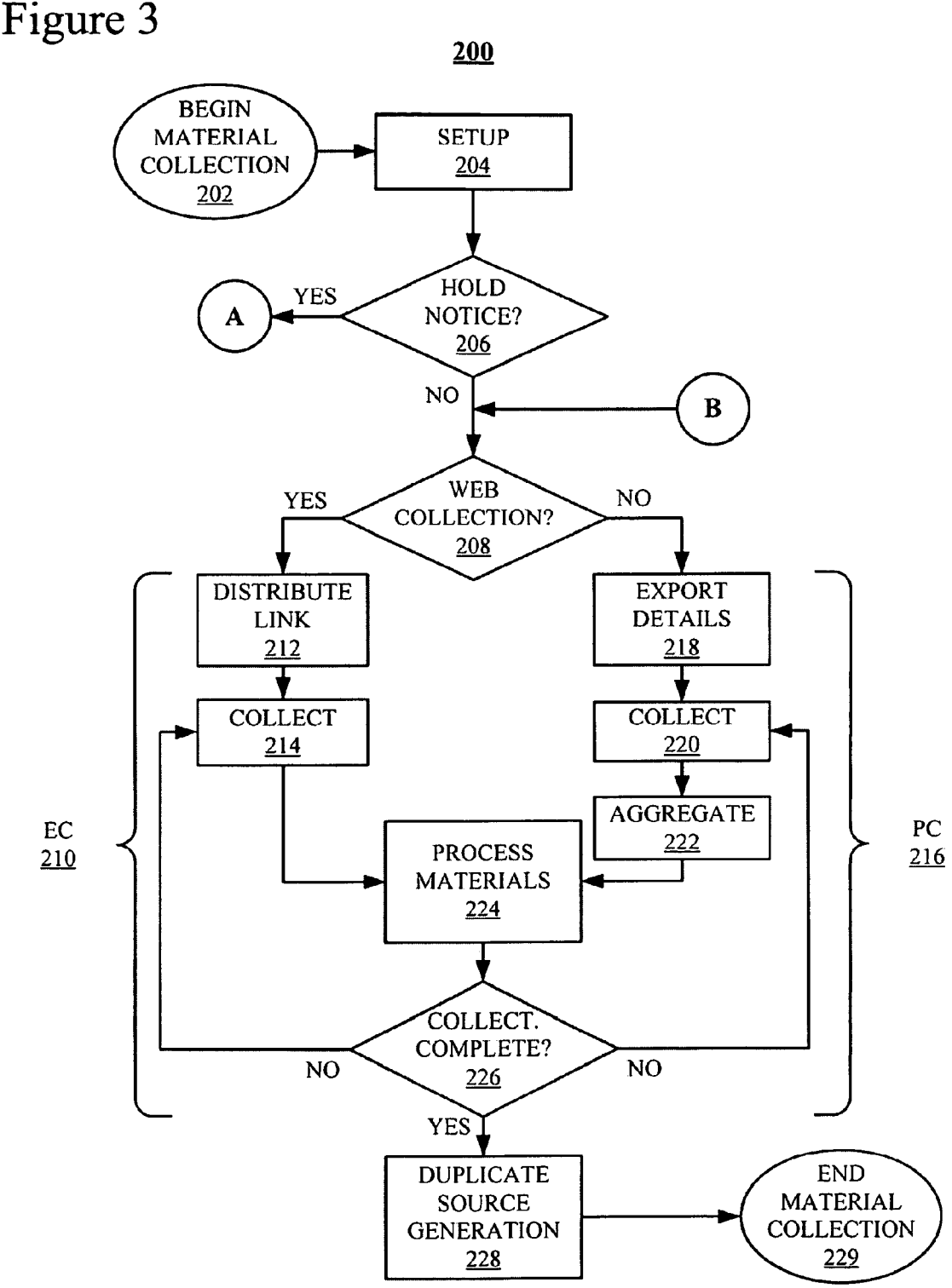
FIG. 3 is a flowchart of a Material Collection process executed by the ADDPSs of FIGS. 1 and 2.

FIG. 3 is a flowchart of a Material Collection process 200 executed by ADDPSs 126 and 146 of FIG. 1. In the following example; process 200 is executing as either a function of ADDPS_E 126 (FIG. 1) or ADDPS_P 146 (FIG. 1) depending upon the particular setup of the document production process. Although typically some functionality of process 200 executes regardless of which ADDPS 126 or 146 is hosting the logic, when necessary, the Specification will identify particular functions that operate specifically on ADDPS 126 or 146. If executing as part of ADDPS_E 126, process 200 is stored on data storage 124 and executes on a CPU (not shown) of server 122. In the following example, when executing as part of ADDPS_P 146, process 200 is stored on data storage, or hard drive, 144 and executes on CPU 102.

Process 200 starts in a "Begin Material Collection" block 202 and proceeds immediately to a "Setup" block 204. During block 204, a system administrator configures various parameters that control functions such as, but not limited to, notification requirements, targeted drives, dates, departments and users, filtering terms, custodial information and so on. Functionality associates with Setup block 204 is described in more detail below in conjunction with FIG. 4.

During a "Hold Notice?" block 206, process 200 determines whether or not process 200 was configured during block 204 to transmit Hold notices to particular parties. A Hold notice is a message that informs selected parties that certain classes of documents may be the subject of a judicial proceeding and must not be altered or deleted. If process 200 determines that Hold notices are required, process 200 proceeds to a Transition Point A. Processing associated with Transition Point A is described in more detail below in conjunction with a "Hold Notice" process 300 of FIG. 5. Following completion of process 300, process 200 proceeds to a "Web Collection?" block 208 via a Transition Point B.

In addition to Transition Point B, process 200 enters block 208 if process 200 determines during block 206 that Hold notices are not required. During block 208, process 200 determines whether or not the particular ADDPS 126 or 146 is configured for web-based data collection, i.e. hosted by ADDPS_E 126, or portable data collection. i.e. hosted by ADDPS_P 146. If process 200 determines that execution in on ADDPS_E 126, control proceeds to an Enterprise Collector (EC) branch 210. If, during block 208, process 200 determines that execution is on ADDPS 146, control proceeds to a Portable Collector (PC) branch 216.

During branch 210, process 200 proceeds to a "Distribute Link" block 212. During block 212, process 200 emails electronic links to parties that are required to produce documents. For example, one or more users of client system 102 are sent an email that enables each user to execute applets associated with ADDPS_E 126 for document production purposes. When a designated custodian opens the email and activates, or "clicks," the enclosed link, a web-enabled graphical user interface (GUI) (not shown) is initiated that guides the custodian through the document production process on client system 102. During a "Collect" block 214, process 200 enable the user to specify documents that are responsive to the particular document production request. In the following example, documents of interest include doc_1 114 (FIG. 1) and doc_2 116 (FIG. 1). In this example, selected documents are stored in DB 136 (FIG. 1). Collection of files is initiated by a custodian using the GUI. Custodians can select files by highlighting particular file names in a list of file names, highlighting groups of files and/or selecting entire directory trees. In other words, an entire directory tree structure or a partial directory tree structure can be selected in combination with a pick-and-choose strategy.

In addition to the collection of files, the collection of materials includes gathering and storing metadata corresponding to collected files, e.g. MD_1 115 (FIG. 1) and MD_2 (FIG. 1). For any particular file type depending upon the file type, the following six types of metadata may be eider collected or generated: 1) file data display; 2) machine metadata; 3) version metadata; 4) decision support objects (DSO) metadata; 5) portable document format (PDF) metadata; and 6) custom properties. Examples of file data display metadata generated for collected documents include a folder path for project documents, archive file name, hash value, file size, file type, document ID and document metadata ID.

Examples of machine metadata include, but are not limited to, a source file path, file name, date created, date last accessed, modification data, file properties and whether the file is, for example, read only, hidden, a system file, eight bit, directory, archive, normal, temporary, sparse file, reparse point, compressed not content indexed or encrypted.

Version metadata fields include information such as, but not limited to, comments, company name, file description, file name, internal name, language, legal copyright, legal trademarks, original file name, product mane, file build part, file major part, file minor part, file private part, file version, product major part, product minor part, product build part, product version, private build, special build and properties such as "Is Debug," "Is Patched," "Is Pre Released," "Is Private Build" and "Is Special Build"

DSO metadata includes, but is not limited to, Microsoft Office (published by Microsoft, Inc. of Redmond Wash.) tags such as file name, application name, title, author, comments, subject, category, company, manager, key words, location (file path), CLSID, which is employed to identify Office documents independently of file extension) and progID, which is employed to identify Office applications that can open a document.

PDF metadata includes, but is not limited to, such information as author, creator, keywords, metadata, producer, subject, text encoding, title, data created, data modified, page height, page width, "Is printable" and "Is Extractable." When present, custom properties include custom, or user defined, Microsoft Office properties.

In addition, an on-the-fly de-duplication process is executed to eliminate duplicate documents and thus reduce the amount of materials that must be stored in database 136. De-duplication is the process of comparing a document to the existing set of stored documents. If a document is unique, the document is added to the collection set. If the document is not unique, i.e. it is a duplicate document, a record of the document is created and stored but the physical document is not added to database 136. The record of the document may include, but is not limited to, information about the collection of the document, e.g. the custodian by whom the document was selected and hash number and any metadata associated with the document. It should be understood that, although a particular file may be a duplicate of another file, metadata associated with the files would typically differ. Therefore, metadata associated with a duplicate file is collected and stored even though the non-metadata portion of the file is not.

There are also provisions made for the identification and handling of modified files. Modified files that have been changed since previously collected and transmitted for storage. Typically, a file that has been modified is not allowed to overwrite a previously submitted version.

If during block 208, process 200 determines that execution is occurring on ADDPS_P 146, i.e. portable collection, control proceeds to PC branch 216. During branch 216, process 200 proceeds to a "Export Details" block 218 during which information corresponding to a specific project as defined during Setup block 204 are copied onto hard drive 144 for the use of ADDPS_P 146. Examples of information corresponding to a project include, but are not limited to, custodian, department and server information. Another example is a set of file names and hash codes (see FIG. 7) corresponding to files that have previously been collected, aggregated and transmitted. Although project details are typically exported to ADDPS_P 146, it should be understood that ADDPS_P 146 also has the capability to add or modify project details on the fly. For example, if a user encounters a custodian that is not listed in exported project details, information about the custodian can be added.

During a "Collect" block 220, process 200, executing in this case by ADDPS_P 146, provides a GUI on client system 102 for one or more users to perform document collection task such as those described above in conjunction with block 214. As in Collect block 214, collection of files is performed by a custodian using a graphical user interface (not shown). Custodians can select files by highlighting particular file names in a list of file names, highlighting groups of files and/or selecting entire directory trees. In other words, an entire directory tree structure or a partial directory tree structure can be selected in combination with a pick-and-choose strategy. Collected files are typically stored for transmission to a server at a later time although transmission can happen simultaneously with collection.

During an "Aggregate" block 222, process 200 collects all materials designated as documents of interest during block 220 by one or more parties and prepares them for transmission to a server such as server 132 for inclusion in DB 136. Block 222 is described in more detail below in conjunction with FIG. 8. Although block 222 is illustrated on PC path 216 because block 222 is responsible for integrating information collected in SDS 148 (FIG. 1) during block 220, block 222 is actually a server-side process. In other words, block 222 executes in conjunction with ADDPS_E 126 to aggregate information collected from multiple sources such as ADDPS_P 146. In the alternative block 222 executes on any server designated as a project repository in a S2S configuration described above in conjunction with FIG. 2. XML files are read by ADDPS_E 126 and collection event information is added to project repository 136 and collected files and metadata are processed as described below during a Process Materials block 224.

Information about custodians that has been added on-the-fly, as explained above in conjunction with block 218, is collected on the server system in conjunction block 222 and all appropriate project rights and securities are automatically updated. Transmission may occur electronically or simply be implemented by unplugging hard drive 144 from client system 102 and attaching it to a server running a version of ADDPS_E 126 and using facilities associated with ADDPS_E 126 to copy files onto the server.

Like in conjunction with Collect block 222, an on-the-fly de-duplication process is executed to eliminate duplicate documents and thus reduce the amount of materials that must be transmitted. The de-duplication process of block 222 compares documents collected during block 220 to documents transmitted to DB 136 in previous iterations of block 222 or block 214. If a document is unique, the document is added to the collection set. If the document is not unique, i.e. it is a duplicate document, a record of the document is created, transmitted to and stored in database 136 but the non-metadata portion of the document is not. The record of the document includes information about the collection of the document, e.g. the custodian by whom the document was selected, and any metadata associated with the document. Although collected materials are typically stored as batch files for transmission at a later time, they may, in the alternative, be transmitted when collected.

Following processing associated with either block 214 or block 222, process 200 proceeds to "Process Materials" block 224. Processing associated with block 224 is described in more detail below in conjunction with a Process Materials process 350 of FIG. 6. It should be noted that once block 224 is complete there is no distinction in project repository 136 between files submitted via server path 210 and via portable path 216. During a "Collection Complete? Block 226, process 200 determines whether or not all the necessary files have been collected. If process 200 determines that document collection is not complete, process returns either to Collect block 214 or collect block 220 and processing continues as described above. Process 200 returns to block 214 if process 200 originally traversed EC path 210 and returns to block 220 if process 200 originally traversed PC path 216.

Once relevant materials have been processed during block 224, process 200 proceeds to a "Duplicate Source Generation" block 228 during which collected materials are analyzed and compared to eliminate duplicate copies of any particular document. De-duplication processes employed during block 228 are in addition to any on-the-fly de-duplication processes executed during block 222. During block 228, selected materials are also organized into batch files so that transmission to a data repository such as DB 136 may be performed in smaller pieces and a fail-safe manner.

Collection queuing and monitor functions handle actual file transfer from remote data collection points to a local repository such as database 136. Files are submitted to a repository with verification of all submissions, resubmissions and errors. If a file transfer results in an error, the file may be resubmitted. Data transfers may be paused and completed, in process and unprocessed data collections identified and documented. The claimed system enables an administrator to determine the number of simultaneous collection queues, with queue counts ranging from one (1) to infinity. The system administrator determines the appropriate number based upon a review of available system resources, thus efficiently managing server utilization and communication bandwidth. In this manner, remote data set collection and aggregation can be monitored, managed and verified. In addition, the claimed subject matter is configured so that a custodian who selects documents for submission does not need to have any rights in the ultimate repository. For example, if file transfers are executed by ADDPS_E 126, only ADDPS_E 126 needs permission to add, delete or modify entries of database 136.

Although duplicate copies are eliminated by de-duplication to reduce the size of the final collection of materials, care is taken so that information relating to the owner and source of each copy is maintained. In other words, although duplicate files are not stored, metadata associated with each duplicate file is preserved so that no information is lost. For example, even though doc_1 114 and doc_2 116 may be identical versions of a particular piece or correspondence, MD_1 115 and MD_2 117 may differ because doc_1 114 and doc_2 116 have different owners and have been accessed at different times. Since metadata may provide important information in a judicial proceeding, MD_1 115 and MD_2 117 are both preserved even though multiple copies of the underlying correspondence are not. Finally, process 200 proceeds to an "End Material Collection" block 229 in which process 200 is complete.

Figure 4:
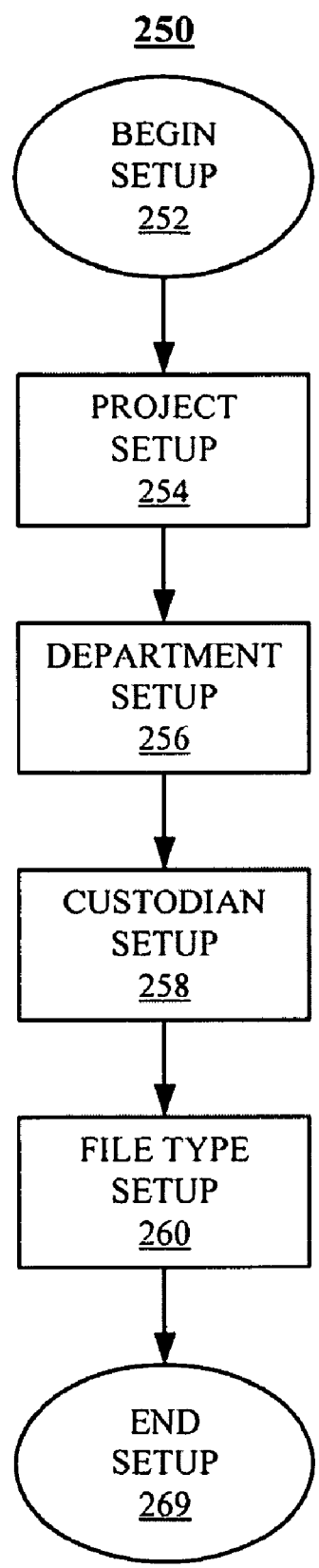
FIG. 4 is a flowchart of a Setup process that executes in conjunction with the Document Collection process introduced in FIG. 3.

FIG. 4 is a flowchart of Setup Process 250, which as explained above in conjunction with Document Collection process 200 (FIG. 3), corresponds to Setup block 204 (FIG. 3). Process 250 starts in a "Begin Setup" block 252 and proceeds immediately to a "Project Setup" block 254. During block 254, a user or administrator defines parameters that determine the configuration of ADDPS 126 and/or 146, i.e. whether the ADDPS 126 or 146 being configured is setup for web-based or portable data collection. The differences between web-based and portable data collection, may include such information as whether or not collected materials are stored locally, e.g. hard drive 144 (FIG. 1) in the case of portable data collection, transmitted to server 122 (FIG. 1) for storage on data storage 124, in one case of web-based data collection, or transmitted to a third server 132 (FIG. 1) for storage on either data storage 134, in a second alternative to web-based data collection.

Examples of information entered during block 254 include, but are not limited to, a project name, a project ID, a file repository path, a message repository path, an index repository path, a project state (e.g. Testing, Production or Closed) and a trace level (e.g. Silent, Normal, Verbose and Extra Verbose). In addition, features may be enabled or disabled. Some examples of features include such things as whether or not to allow file with unknown file extensions to be collected, whether or not network files are collected immediately of sent to a queue for collection at a later time, whether or not email is to be collected and whether or not to enable file modification detection, a real-time audit, self-registration of users not currently listed in the system or text indexing.

During a "Department Setup" block 256, a user or administrator defines and selects particular groups, or departments, that are the targets of the data collection process and associates the departments to particular projects. It is not necessary that a list of departments for a particular project match a target company's organizational chart. Departments are defined to group similar custodians for document collection and packaging efforts.

During a "Custodian Setup" block 258, the administrator defines parameters that define the users that are permitted to provide and/or access the collected materials. Examples of information defined during block 258 include custodian names, custodian IDs, user names, departments, email addresses, telephone numbers and site location. Also defined during block 258 are project permissions assigned to each custodian. For example, some custodians are allowed to submit materials for a project and other custodians are provided with administrative responsibilities. By default, a custodian is only able to submit materials for collection; a custodian must be explicitly defined as an administrator before allowed to perform certain other tasks such as deleting already collected files and generating reports. As explained above, custodians may also be defined on-the-fly during execution of ADDPS_P 146.

During a "File Type Setup" block 260, the administrator defines parameters that control collections of particular file types. One method of defining file types is by file extension. For example, one project may collect only materials with file extensions indicating the file is an email. Other projects may be interested in such materials as spreadsheets, diagrams, word processing documents or graphic files. Those with skill in the computing arts should appreciate other methods for defining file types rather than file extensions.

Block 260 also enables administrators to manage related file types as a group. One example of a built-in file type group is based upon MIME file types. For example, a video file type category is a collection of common video file types, e.g. .AVI and .MOV file, both of which are an Internet standard file types. In additions, an administrator can create a custom file type. Two reasons an administrator may create a custom file type include 1) to define a group of approved file types if documents are filtered by file type at the time of collection; and 2) to collect all known file types that can be rendered to a particular file type, such as all files that may be converted to .TIF files. Finally, process 250 proceeds to an "End Setup" block 269 in which process 250 is complete.

Figure 5:
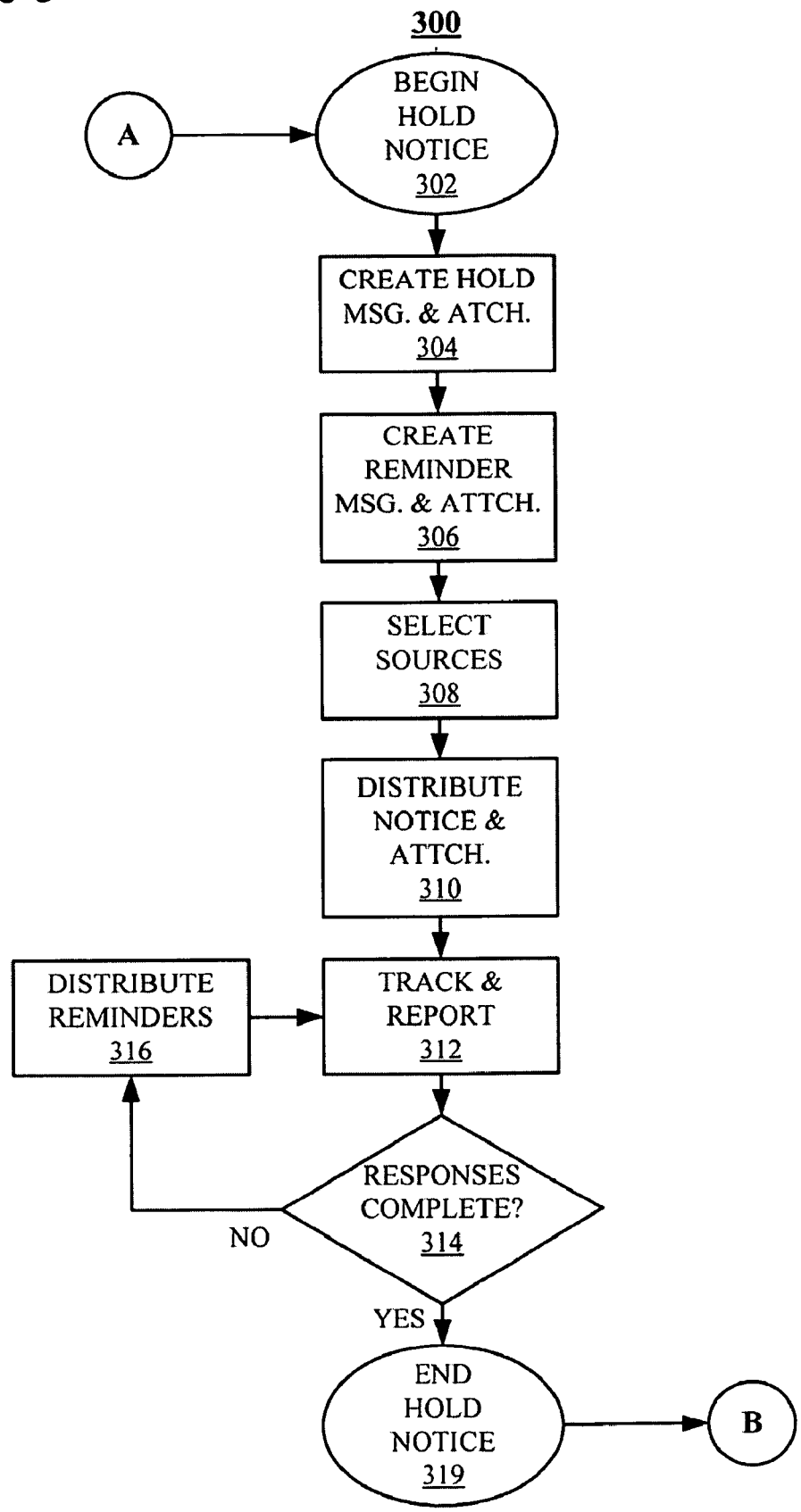
FIG. 5 is a flowchart of a Hold Notice Process that executes in conjunction with the Document Collection process introduced in FIG. 3.

FIG. 5 is a flowchart of a Hold Notice Process 300 that executes in conjunction with Document Collection process 200 introduced in FIG. 3. Process 300 is initiated via Transition Point A (FIG. 3) if, during Hold Notice? Block 206 (FIG. 3), process 200 determines that ADDPS_E 126 (FIG. 1) or ADDPS_P 146 (FIG. 1) was configured to transmit Hold notices to particular parties, or custodians. As explained above in conjunction with FIG. 3, a Hold notice is a message that informs selected parties that certain documents or types of documents may be the subject of a judicial proceeding and must not be altered or deleted.

Process 300 depends upon custodian information configured by the system administrator during Custodian Setup block 258 (FIG. 5) of Setup process 250 (FIG. 5). Hold notices are distributed, tracked and reported as described below based upon project specific custodian lists. Hold notice text and response options are configured on a per project basis. As new custodians are added or removed from a project, the Hold Notice system automatically tracks the changes for distribution and reporting purposes.

Process 300 starts in a "Begin Hold Notice" block 302 and proceeds immediately to a "Create Hold Message and Attachment" block 304. During block 304, process 300 generates a set of standardized Hold messages based upon a template that has been identified during Project Setup block 254 (FIG. 4) of Setup process 250 (FIG. 4). Attachments are also created to include specific information relating to the types of documents that are the target of the material collection process. During a "Create Reminder Message and Attachment" block 306, follow up messages and attachments corresponding to the messages and attachments generated during block 304 are generated.

During a "Select Sources" block 308, parties that need to be notified are identified. Such parties include any people that may have correspondence and/or documents relevant to the particular judicial proceeding for which Material Collection process 200 has been initiated. During a "Distribute Notice and Attachment" block 310, the messages and attachments generated during block 304 are distributed to the parties identified during block 308, typically via email.

During a "Track and Report" block 312, acknowledgements are collected from the parties identified during block 308 to ensure that each party has received the message and attachments generated during block 304 or block 306. The acknowledgements are stored to document that proper steps have been taken to preserve necessary materials subject to collection, a common requirement for document production related to judicial proceedings. During a "Responses Complete?" block 314, process 300 determines whether or not each party identified during block 308 has acknowledged the receipt of the message and attachment. If not, process 300 proceeds to a "Distribute Reminders" block 316 during which the reminder messages and attachments generated during block 306 are transmitted to each party for which an acknowledgement has not been received during block 312. Process 300 then returns to block 312 and processing continues as described above.

Once all acknowledgements have been received during block 314, process 300 proceeds to an "End Hold Notice" block 319 in which process 300 is complete. Control then proceeds via Transition Point B (FIG. 3) to Web Collection? Block 208 (FIG. 3).

Figure 6:
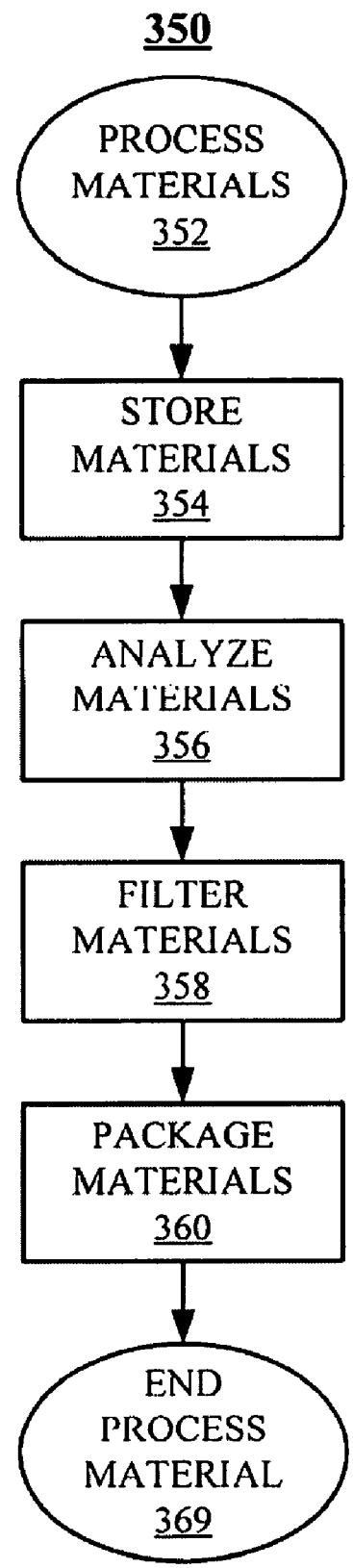
FIG. 6 is a flowchart of a Process Materials process that executes in conjunction with the Document Collection process introduced in FIG. 3.

FIG. 6 is a flowchart of a Process Materials Process 350, which corresponds to Process Materials block 224 described above in conjunction with Document Collection process 200 of FIG. 3. Process 350 starts in a "Begin Process Materials" block 352 and proceeds immediately to a "Store Materials" block 354. During block 354, process 350 takes documents collected during Collect blocks 214 and 222 (FIG. 3) that remain after de-duplication activities during blocks 214, 222 and 228 (FIG. 3) and transmitted during block 228. There are many ways in which collected files may be transmitted to a document repository such as DB 136 (FIG. 1). In one example, as explained above, files are transmitted over the Internet 120 (FIG. 1) in conjunction with a web-based embodiment such as ADDPS_E 126 (FIG. 1). In a second example, files are simply be copied from hard drive 144 (FIG. 1) after hard drive 144 is disconnected from client system 102 and attached to a server such as servers 122 or 132 (FIG. 1). Another transmission medium may include a VPN connection such as VPN 176 (FIG. 2).

During an "Analyze Materials" block 356, the documents stored during block 354 are processed to determine such things as whether or not a particular file represents a duplication or modification of another file. During a "Filter Materials" block 358, process 350 eliminates any files stored during block 354 that do not match selected criteria. Criteria include, but are not limited to, department, custodian, file type category, file type, de-duplicated status, date range, date last modified range, date last accessed range and one or more key word search terms. The filter functionality also enables a user to filter a list of files by searching for substrings of a file name. For example, text files can be selected by filtering file names for the presence of the term ".txt." If the character '-' is placed in front of a search term, the filter identifies all documents that do not contain the term. Substring searching works to identify a file regardless of where in a file name the search term is positioned.

The disclosed technology also includes a "SearchFlex" feature. SearchFlex is a process in which user interface inputs are transformed into values for insertion into a table (not shown) of a database such as database 136. The stored values are then employed to generate specific queries that identify files within the project repository that match selection criteria. By abstracting user interface selected criteria into specific values, system developers have the flexibility to add additional search criteria to the user interface without reprogramming the underlying server system or database query constructs used to identify relevant files. In addition, system performance is enhanced by applying only search criteria specified by the system user by the elimination of unused query constraints within the system query.

During a "Package Materials" block 360, process 350 creates a de-duplicated and filtered set of files and accompanying reports that are ready for further processing. Further processing may involve such tasks as TIF rendering, indexing, or loading the files into a file review tool. Other tasks executed during block 360 include calculating the package size, testing the write process and generating reports. The package creation process enables a system administrator to configure the eventual output to specific project requirements. In other words, file sets may be selected and exported based upon the specific project requirements. De-duplication and filter settings may be configured to export a data set that, for example, provides the inclusion or exclusion of supplicate files. Documents for individual custodians or custodian groups may be selected. File types, groups or individual types, data ranges and keyword selection criteria may be applied. The package process output includes the filtered electronic file set with the associated metadata values standardized regardless of file type. Finally, control proceeds to an "End Process Collection" block 369 in which process 350 is complete.

Figure 7:
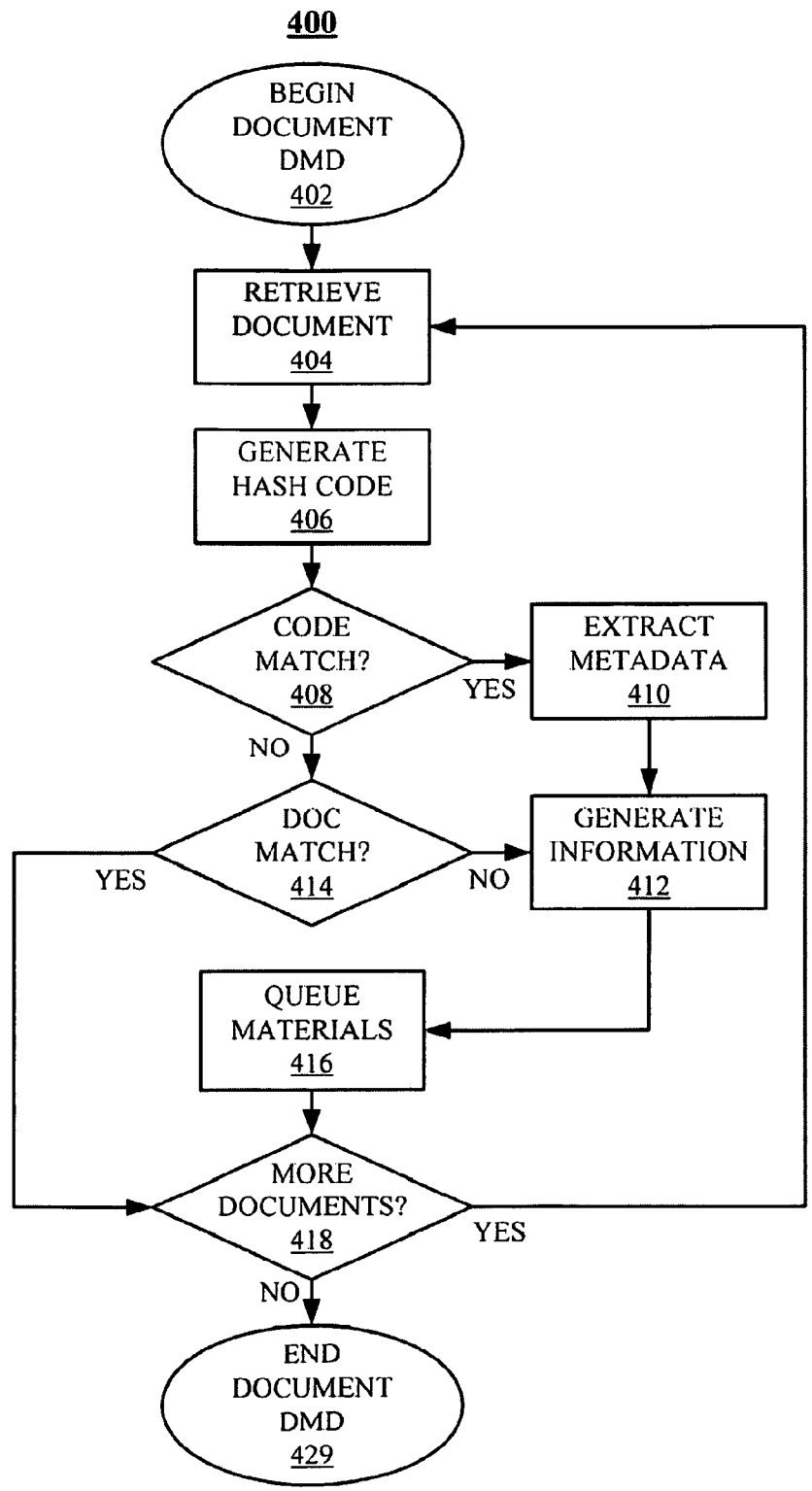
FIG. 7 is a flowchart of a Document De-Duplication and Modification Detection (DDMD) process that implements the claimed subject matter.

FIG. 7 is a flowchart of a Document De-Duplication and Modification Detection (DDMD) process 400 that implements the claimed subject matter. In this example, process 400 is implemented in conjunction with both Collect block 214 (FIG. 3) and Collect block 220 (FIG. 3) or Aggregate block 222 (FIG. 3) of Material Collection process 200, both introduced above in conjunction with FIG. 3. Process 400 typically executed on a system such as server 132 (FIG. 1), which includes database 136 (FIG. 1). Collection involves two aspects: 1) file de-duplication; and 2) file modification detection. Both aspects are illustrated here as parts of a single process although they may be executed at different times. De-duplication and modification detection may each be implemented at almost any stage of the document collection process. If done at the source of a document collection process, the techniques provide the greatest efficiencies by eliminating the transmission of unnecessary information. However, the disclosed de-duplication and modification detection technologies provide advantages over typical document production techniques regardless of in which stage process 400 is executed.

Process 400 starts in a "Begin Document DND" block 402 and proceeds immediately to a "Retrieve Document" block 404. During block 404, process 400 retrieves a document for processing. In the following example, the first document retrieved is doc_1 114 (FIG. 1), which has been collected and stored in hard drive 144 (FIG. 1). During a "Generate Hash Code" block 406, process 400 generates a hash code for the document retrieved during block 404. It should be understood that the generated hash code is based upon the non-metadata portions of doc_1 114, i.e. doc_1 114 without the information stored in MD_1 115 (FIG. 1).

Those with skill in the computing arts should understand the different techniques for the generation of hash codes. Of course, the particular technique chosen must be robust enough to enable process 400 to avoid identifying documents that differ even slightly as identical. One example of a suitable hash code is a Message-digest algorithm 5 (MD5) hash function. MD5 is a widely used cryptographic hash function with a 128-bit hash value that is employed in a wide variety of security applications. An MD5 hash is typically expressed as a 32-character hexadecimal number.

During a "Code Match?" block 408, the hash code generated during block 406 is compared to hash values stored in either a table (not shown) of DB 136, a locally generated table or a table of hash codes transmitted in conjunction with project details during Export Details block 218 (FIG. 3). Employing the results of the comparison, process 400 determines whether or not the code generated during bock 406 matches a stored hash code. A match indicates that doc_1 114 is a duplicate of a file that has already been either stored in DB 136 or placed in the transmission queue. A duplicate file may have been stored during the same or a previously executed instantiation of processes 200 and 400. If a match is found, process 400 proceeds to an "Extract Metadata" block 410.

During block 410, process 400 extracts MD_1 115 from doc_1 114. It should be noted that different applications produce different types and formats of metadata. For example, metadata from a Word document differs from metadata from a .pdf document both in the actual information stored and the storage format. The disclosed technology modularizes the collection of metadata by providing separate, plug-in programming objects for each type of file. In this manner, metadata collection is standardized among different type of documents and new applications and formats may be incorporated into the disclosed system with minimal disruption to the remainder of the logic. Further, a standard format is defined for metadata.

After MD_1 115 has been extracted from doc_1 114 during block 412, process 400 proceeds to a "Generate Information" block 414. During block 414, process 400 generates information that relates to doc_1 114 in addition to MD_1 115. Additional information may include, but is not limited to, information relating to the current retrieval and collection of doc_1 114 or information that establishes a link between the current document and any file to which the document may have shared a hash code. i.e. a previously collected duplicate file.

If during block 408, process 400 determines that the code generated during block 406 does not match the code of a previously submitted file, control proceeds to a "Document (Doc.) Match?" block 414. During block 414, process 400 determines whether or not the file retrieved during block 404, or doc_1 114 in this example, corresponds to any previously submitted document. One example of a corresponding document is a previously submitted file with an identical name, an identical file path and stored on the same data storage. A corresponding document with a different hash code is indicative of a file that has been modified since the file was previously submitted. If process 400 determines there is no corresponding document, i.e. doc_1 114 is a not a modified document, control proceeds to block 412 during which, as explained above, process 400 generates information that relates to doc_1 114 in addition to MD_1 115.

If process 400 determines during block 414 that the document is a match, i.e. a modified version of a previously submitted document, control proceeds to a "More Documents?" block 418. In other words, modified documents are automatically not placed in the transmission queue. Of course, processes 400 can also be configured to transmit modified documents but not duplicate ones.

Once process 400 has completed processing associated with block 412, control proceeds to a "Queue Materials" block 416. During block 416, the document determined to be unique during block 414, including associated metadata and chain of custody, is added to a document queue for collection. In the alternative, a document is transmitted to database 136 as soon as process 200 determines that the document is not a duplicate or a modified version of an existing document. If block 416 is reached via block 410 and 412, MD_1 115 and the information generated during block 412 are included in the collection queue but the non-metadata portions of doc_1 114 are not.

During a "More Documents?" block 418, process 400 determines whether or not hard drive 144 has any additional documents that need to be processed. If so, process 400 returns to Retrieve Document block 404 and processing continues as described above. For example during a second iteration through blocks 404, 406, 408, 410, 412, 414, 416 and 418, process 400 processes doc_2 116 (FIG. 1), which may or may not be a duplicate of doc_1 114, as determined during block 408, or a modified version of doc_1 114, as determined during block 414. Finally, if during block 420, process 400 determines there are no more files to be processed, control proceeds to an "End Document DMD" block 429 in which process 400 is complete.

Figure 8:
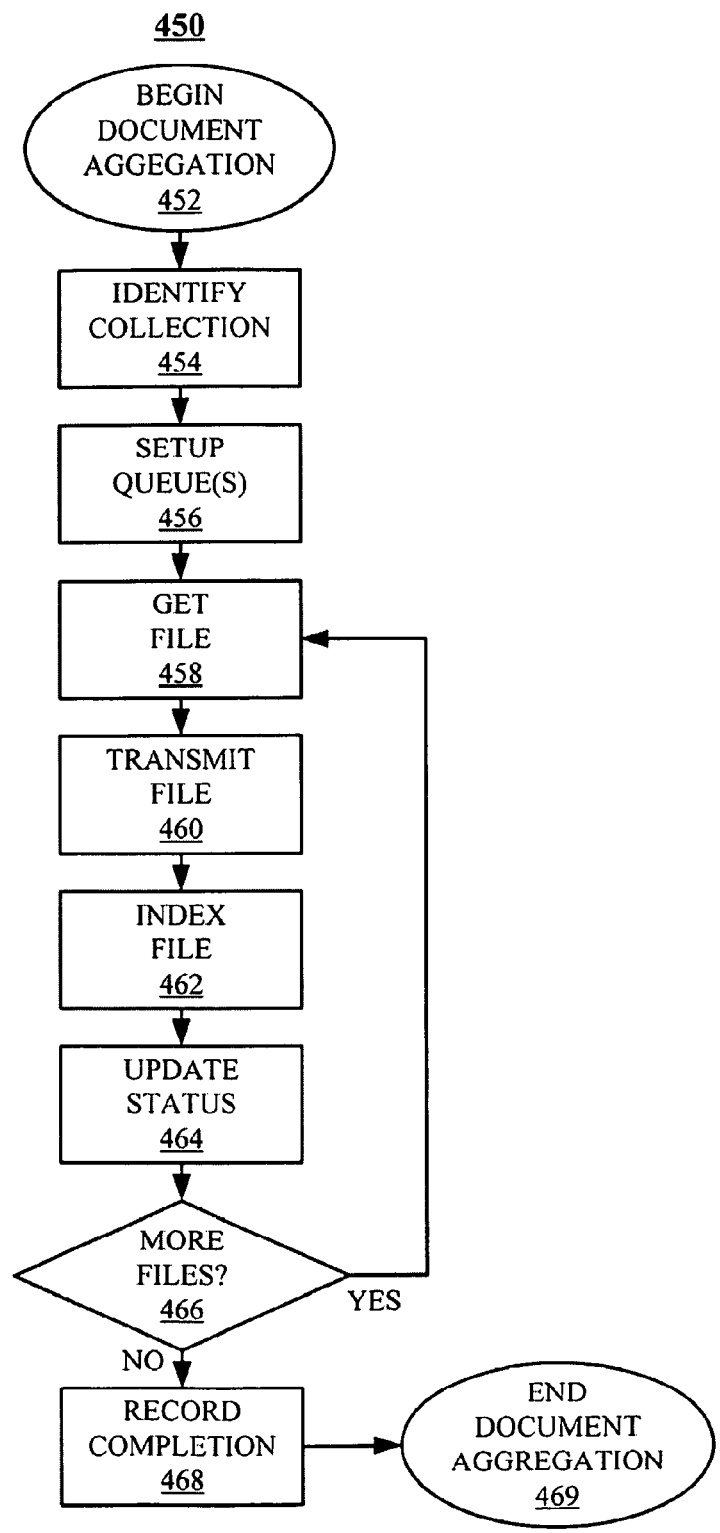
FIG. 8 is a flowchart of a Document Aggregation process employed in conjunction with the claimed subject matter.

FIG. 8 is a flowchart of a Document Aggregation process 450 employed in conjunction with the claimed subject matter.

Process 450 corresponds to Aggregate block 222 (FIG. 3) and may be executed on any server designated as a project repository such as data base 136 (FIG. 1). Process 450 starts in "Begin Document Aggregation" block 452 and proceeds immediately to an "Identify Collection" block 454. During block 454, process 450 determines a particular collection of material to transmit to a project repository. In this example, process 450 collects materials stored in SDS 148 (FIG. 1) that were collected during Collect block 220 (FIG. 3) and transmits and stores the material in data base 136.

During a "Setup Queue(s)" block 456, process 450 establishes communication channels for the transfer of materials. As described above in conjunction with FIG. 3, the disclosed technology enables an administrator to determine the number of simultaneous collection queues, with queue counts ranging from one (1) to infinity. The number of queues is based upon a review of available system resources, thus efficiently managing server utilization and communication bandwidth.

During a "Get File" block 458, process 450 identifies a file for transfer from SDS 148 to database 136 and, during a "Transmit File" block 460 actually executes the transfer. During an "Index File" block 462, the contents of the transmitted file are indexed, if the system administrator has enabled that option. Indexing information is stored in tables (not shown) of database 136 and provide a efficient way to search collected files stored in database 136.

During an "Update Status" block 462, process 450 updates a table of database that stores information relating to the transfer of the collection identified during block 454. Some possible status values include. "Paused," "In Progress," "Halted," and "Completed." By maintaining a status while collection aggregation is executing, errors in transmission can be identified, documented and unprocessed data collections eventually completed in a fail-safe manner. Of course, a processing or communication error may interrupt the transfer and, thus, recovery mechanisms are also provided.

During a "More Files" block 464, process 450 determines whether or not all the files in the collection identified during block 454 have been successfully transferred. If not, process 450 returns to block 458, retrieves the next unprocessed file and processing continues as described above. If during block 466 that all files have been transmitted, process 450 proceeds to a "Record Completion" block 468 during which the status information is updated to "Completed" to indicate a successful transfer of all the files. Finally, process 450 proceeds to an "End Document Aggregation" block 469 in which process 450 is complete.

While the claimed subject matter has been shown and described with reference to particular embodiments thereof, it will be understood by those skilled in the all that the foregoing and other changes in form and detail may be made therein without departing from the spirit and scope of the claimed subject matter, including but not limited to additional, less or modified elements and/or additional, less or modified blocks performed in the same or a different order.

We claim:

1. A method for the organization and collection of documents, comprising:
    collecting a first document, including a metadata portion and a non-metadata portion, in response to a document collection request;
    generating a first hash code corresponding to the non-metadata portion of the first document;
    comparing the first hash code to a plurality of hash codes, each hash code of the plurality of hash codes corresponding to a non-metadata portion of a corresponding document of a plurality of documents, each document collected in response to the document collection request;
    if the first hash code does not match any hash code of the plurality of hash codes, storing the first document, including the metadata portion and the non-metadata portion, on a data storage device; and
    if the first hash code matches any hash code of the plurality of hash codes, extracting metadata corresponding to the first document; and
    storing on the data storage device the extracted metadata, but not the non-metadata portion of the first document, in conjunction with the particular document corresponding to the hash code that matches the first hash code.

2. The method of claim 1, further comprising:
    generating collection event information concerning the collection of the first document; and
    storing on the data storage device the collection event information in conjunction with the first document or the extracted metadata, depending upon whether the first document or the extracted metadata is stored, respectively.

3. The method of claim 1, further comprising:
    generating chain of custody information corresponding to a party collecting the first document; and
    storing on the data storage the chain of custody information in conjunction with the with the first document if the first hash code and second hash code do not match.

4. The method of claim 1, further comprising:
    determining whether or not the first document and a second document of the plurality of documents represent the same document; and
    preventing the first document from being stored on the data storage device if the first document and the second document represent the same document and the first hash code does not match the hash code corresponding to the second document.

5. The method of claim 1, wherein the hash code is generated using a Message-digest algorithm 5 (MD5) hash function.

6. A system for the organization and collection of documents, comprising:
    a processor;
    a memory coupled to the processor; and
    logic, stored on the memory for execution on the processor, for
        collecting a first document, including a metadata portion and a non-metadata portion, in response to a document collection request;
    generating a first hash code corresponding to the non-metadata portion of the first document;
    comparing the first hash code to a plurality of hash codes, each hash code of the plurality of hash codes corresponding to a non-metadata portion of a corresponding document of a plurality of documents, each document collected in response to the document collection request;
    if the first hash code does not match any hash code of the plurality of hash codes, storing the first document, including the metadata portion and the non-metadata portion, on a data storage; and
    if the first hash code matches any hash code of the plurality of hash codes, extracting metadata corresponding to the first document: and
    storing on the data storage the extracted metadata, but not the non-metadata portion of the first document, in conjunction with the particular document corresponding to the hash code that matches the first hash code.

7. The system of claim 6, the logic further comprising logic for:
generating collection event information concerning the collection of the first document; and
storing on the data storage the collection event information in conjunction with the first document or the extracted metadata, depending upon whether the first document or the extracted metadata is stored, respectively.

8. The system of claim 6, the logic further comprising logic for:
generating chain of custody information corresponding to a party collecting the first document; and
storing on the data storage the chain of custody information in conjunction with the first document.

9. The system of claim 6, the logic further comprising logic for:
determining whether or not the first document and a second document of the plurality of documents represent the same document; and
preventing the first document from being stored on the data storage in conjunction with the second document if the first document and the second document represent the same document and the generated hash code does not match the second hash code.

10. The system of claim 6, wherein the hash code is generated using a Message-digest algorithm 5 (MD5) hash function.

11. A computer programming product for the organization and collection of documents, comprising:
a memory; and
logic, stored on the memory for execution on a processor, for:
collecting a first document, including a metadata portion and a non-metadata portion, in response to a document collection request;
generating a first hash code corresponding to the non-metadata portion of the first document;
comparing the first hash code to a plurality of hash codes, each hash code of the plurality of hash codes corresponding to a non-metadata portion of a corresponding document of a plurality of documents, each document collected in response to the document collection request;
the first hash code does not match any hash code of the plurality of hash codes, storing the first document, including the metadata portion and the non-metadata portion, on a data storage; and
if the first hash code matches any hash code of the plurality of hash codes, extracting metadata corresponding to the first document; and
storing on the data storage the extracted metadata, but not the non-metadata portion of the first document, in conjunction with the particular document corresponding to the hash code that matches the first hash code.

12. The computer programming product of claim 11, the logic further comprising logic for:
generating collection event information concerning the collection of the first document; and
storing on the data storage the collection event information in conjunction with the first document or the extracted metadata, depending upon whether the first document or the extracted metadata is stored, respectively.

13. The computer programming product of claim 11, the logic further comprising logic for:
generating chain of custody information corresponding to a party collecting the first document; and
storing on the data storage the chain of custody information in conjunction with the first document.

14. The computer programming product of claim 11, the logic further comprising logic for:
determining whether or not the first document and a second document of the plurality of documents represent the same document; and
preventing the first document from being stored on the data storage in conjunction with the second document if the first document and the second document represent the same document and the generated hash code does not match the second hash code.

15. The computer programming product of claim 11, wherein the hash code is generated using a Message-digest algorithm 5 (MD5) hash function.

* * * * *